US006642493B1

(12) United States Patent
Barbosa et al.

(10) Patent No.: US 6,642,493 B1
(45) Date of Patent: Nov. 4, 2003

(54) COMPACT MODULAR, CONFIGURABLE BASE FOR POSITION SENSITIVE PHOTO-MULTIPLIERS

(75) Inventors: Fernando J Barbosa, Newport News, VA (US); Stanislaw Majewski, Yorktown, VA (US); Juan J. Vaquero, Madrid (ES)

(73) Assignee: Southeastern Universaties Research Assn., Newport, VA (US)

( * ) Notice: Subject to any disclaimer, the term of this patent is extended or adjusted under 35 U.S.C. 154(b) by 57 days.

(21) Appl. No.: 10/071,515

(22) Filed: Feb. 8, 2002

(51) Int. Cl.[7] ............................ H01J 40/14; G01T 1/20

(52) U.S. Cl. ................. 250/207; 250/366; 250/214 LA

(58) Field of Search ............................ 250/207, 214 R, 250/214 A, 214 LA, 214 VT, 366; 313/105 R

(56) References Cited

U.S. PATENT DOCUMENTS 4,967,084 A * 10/1990 Rich
5,453,610 A * 9/1995 Gibbons
6,232,605 B1 * 5/2001 Soluri
6,552,348 B2 * 4/2003 Cherry

* cited by examiner

*Primary Examiner*—David Porta
*Assistant Examiner*—David C. Meyer

(57) ABSTRACT

A modular base for a position sensitive Photo-Multiplier Tube (PS-PMT) that can be connected to other similar modular bases to form arrays of PS-PMTs. X and Y resistor chains are provided within the base to connect all X and Y coordinate anodes from the PS-PMT, respectively. An amplifier is provided at each end of each resistor chain to amplify output signals when the base is used alone; not connected to other bases. Jumpers associated with each amplifier are provided to include the amplifier in the output signal path or bypass the amplifier and connect to jumpers of other bases. When a base is used alone, the jumpers, which provide either an X or Y output signal, are set to include the amplifier in the output signal path. When two bases are connected together, the jumpers are set to bypass their associated amplifiers and connect the respective X or Y resistor chains of the two bases. The present method advantageously maintains the number of required amplifiers for each X or Y coordinate at two, no matter how many bases are used in the a row or column.

20 Claims, 6 Drawing Sheets

COMPACT MODULAR, CONFIGURABLE BASE FOR POSITION SENSITIVE PHOTO-MULTIPLIERS

The present invention relates generally to Position Sensitive Photo-Multiplier Tubes (PS-PMTs), and more specifically to a compact, modular base for a PS-PMT.

A Position Sensitive Photo-Multiplier Tube (PS-PMT) is a photosensitive device that converts light photons into an electrical current. The main components of a PS-PMT are an input window, a photocathode, focusing electrodes, dynodes and at least one anode (output). The photocathode is used for converting incoming light (photons) into electrons. These photoelectrons, which are a product of photoelectric effect, are directed by the potential of focusing electrodes towards dynodes. The dynodes are used to multiply the electrons by the process of secondary electron emission. Electron gains of $10^3$ to $10^8$ are common and depend on the number of dynodes and inter-dynode potentials. Dynodes are made of or covered with a layer of secondary emissive material. The condition of the dynode surfaces are responsible for PS-PMT stable gain performance. All known dynode emissive materials are sensitive to electron stress. The most sensitive dynodes are those that are at the end of the stages of dynodes, where the quantity of secondary electrons emitted is the largest. Understandably, for long-term, stable operation of a PS-PMT, a low anode current is preferable.

The voltages that create the electrostatic fields between the photocathode, the focusing electrodes and the dynodes are delivered from a single high-voltage stable power supply and a voltage divider. The divider is a common part of a PS-PMT base. The design of the divider circuit is crucial to getting the best performance from the PS-PMT. There are many versions of PS-PMT high voltage dividers optimized or designed for some particular application. Most of them are concentrated on specific parameters that are critical for a given application, such as maximum gain, dynamic range, low noise, or linearity. Series-regulator type high voltage power supplies optimized for photomultiplier tubes are well known in the art and have gained a good reputation. Other components found in or required by scintillation cameras, PS-PS-PMTs, are described in "Photomultiplier Tube, Principle to Application" by Hamamatsu Photonics K. K., March 1994, which is incorporated herein by reference.

The output of a photomultiplier tube is a current (charge), while the external signal processing circuits are usually designed to handle a voltage signal. Therefore, the current output must be converted into a voltage signal by a current to voltage converter. Further, the current that is output from a PS-PMT anode is very small, especially in low light level detection, low gain PS-PMT's, and photon counting applications. An operational amplifier can be used to both convert the anode output current to a voltage and accurately amplify the resulting voltage. Typically this operational amplifier is powered by a source that is separate from the high voltage power source for the dynode stages of the PS-PMT. This is done to insure the stability of the power supply to the dynodes.

Many PS-PMTs have multiple anodes that are usually arranged in X and Y arrays to provide accurate imaging capabilities. The analog signal outputs from the anodes can be processed individually or combined in a variety of ways and the results analyzed using appropriate data acquisition systems under computer control. The processed data can then be displayed on a video monitor for further study of the subject being imaged. The need for improved image resolution and/or larger imaging area of PS-PMTs requires increasing the number of anode electrodes, which is limited by technology developments in the area of fabrication of photomultiplier devices. Alternatively, the imaging area can be increased by just-a-posing individual PS-PMTs in the form of arrays and matrices. However, this method has many draw backs including the possibility of overlapping or creating gaps in the imaging area. Therefore, improving image resolution and/or providing a larger imaging area of PS-PMTs requires increasing the number of anode electrodes.

Individual anode electrodes are normally connected to sensitive signal amplifiers with appropriate specifications for signal bandwidth, noise and gain. Because of electrical performance considerations, such analog instrumentation is usually placed as close as physically permissible to the anode electrodes. However, as the number of electrodes increase or the size of the PS-PMT decreases, the instrumentation required by each individual electrode becomes prohibitive due to physical and/or cost constraints.

In order to overcome some of the physical and cost limitations, caused by the instrumentation electronics associated with each anode electrode, a resistive divider readout technique can be employed. Because the anode electrodes in a PS-PMT are functionally identical to a current source, anode electrodes for the same imaging coordinate can be interconnected in a chain by means of resistors. The last anode electrode on each end of the resistor chains is then connected to a load resistor, and the signal developed across this load can be amplified as required. By characterizing the analog signals from each end of the chain, it is possible to determine the position of occurrence of photon events along the interconnected chain of anode electrodes. Thus, the number of analog signal channels with resistive divider readout is independent of the total number of anode electrodes and is reduced to two channels per coordinate; two X outputs and two Y outputs.

Applications employing the use of multiple PS-PMTs to cover larger imaging areas, than a single PS-PMT, are usually complex, costly and specific to the requirements imposed by the implementation. Such applications have been described in Koji Inoue, et al., "Nuclear Instruments and Methods", A 423 (1999) pp. 364–368. If still larger imaging areas are required, the number of electronic channels is correspondingly increased or a new and specific implementation is needed.

The present concept is to provide an array of PS-PMTs that is simple, modular and non-specific. This is achieved by providing a user-configurable electronics base that connects to a single PS-PMT and contains circuitry for high voltage biasing, dynode signal extraction and amplification for fast trigger qualification, resistor chains for each of the X and Y coordinates, signal amplifiers and configuration jumpers. This user-configurable base can be used by itself for imaging a subject, it can be connected to one other user-configurable base to double the imaging area, or it can be connected to multiple user-configurable bases to form a matrix of PS-PMTs.

SUMMARY OF THE INVENTION

A modular base for a position sensitive photo-multiplier tube that can be used by itself and can be coupled to one or more like modular bases to create a matrix of bases. The present base provides multiple options to a user in regards to the number of bases to be used in either the X or the Y coordinates within the matrix. Each modular base comprises: resistor chains that connect the anodes in each X and Y coordinate; circuitry for high voltage biasing that provides power to the dynode stages of the PS-PMT; and, circuitry for dynode signal extraction and amplification that provides fast trigger qualification. Each base also includes two signal amplifiers for each X and Y coordinate output, for a total of four amplifiers. Both signal amplifiers for each coordinate are only used when the base is not attached to other bases. Configuration jumpers provided in each base are used to connect X and Y outputs to other modular bases.

The position sensitive photo-multiplier tube (PS-PMT) includes multiple X coordinate anode outputs, multiple Y coordinate anode outputs, and each set of multiple outputs are coupled together by the resistor chains.

It is an object of the present invention to provide a compact modular PS-PMT base that can be used alone or in combination with an unlimited number of similar bases.

It is another object of the present invention to reduce the amount of required hardware in PS-PMT arrays.

It is a further object of the present method to allow a user the freedom to specifically build an array of bases based on the required number of PS-PMT's.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
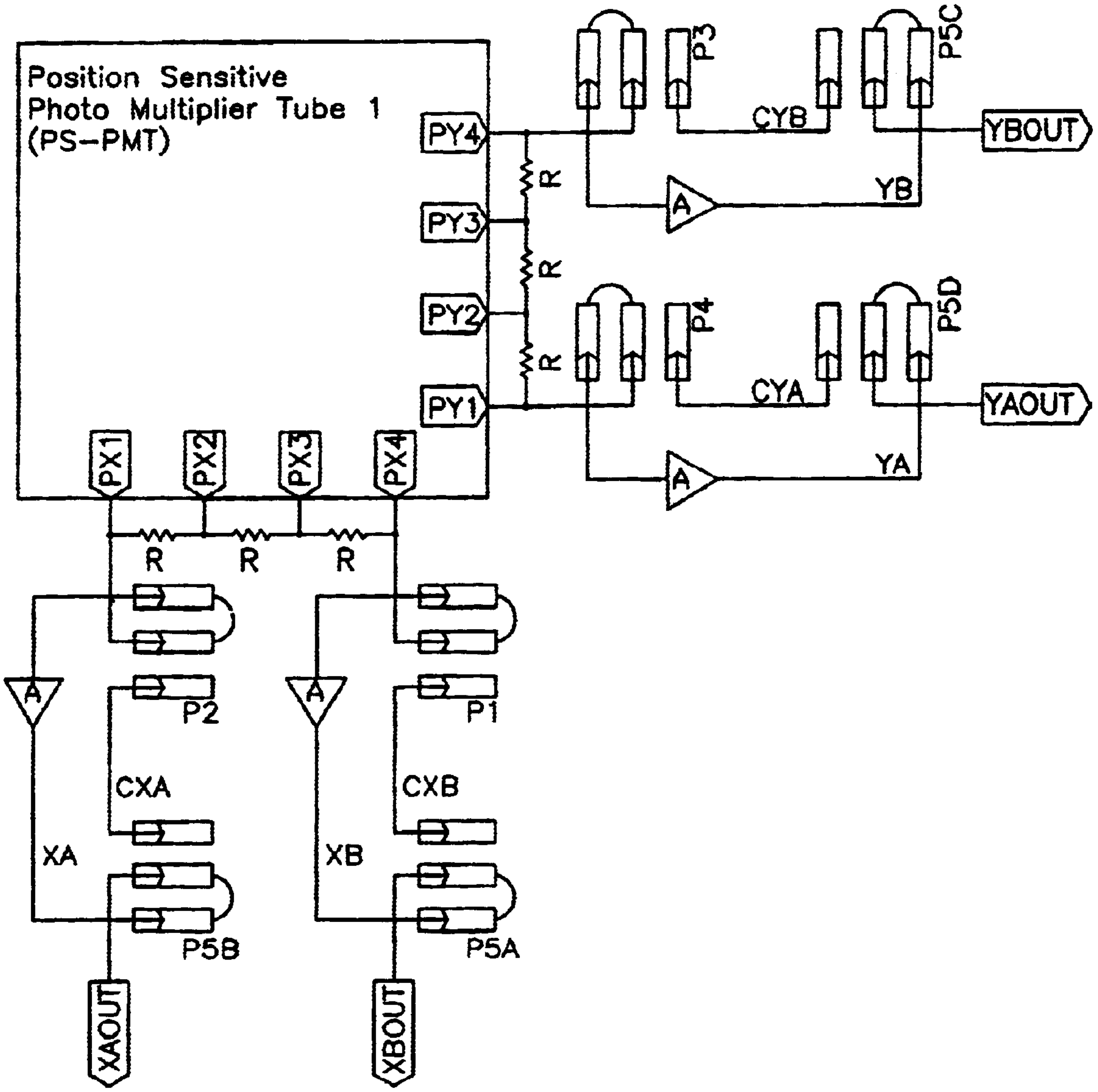
FIG. 1 shows an exemplary embodiment of a single configurable Position Sensitive Photo-Multiplier Tube (PS-PMT) base.

FIG. 1 is a schematic diagram for an exemplary Position Sensitive Photo-Multiplier Tube (PS-PMT) compact, modular base. In this embodiment, the base accepts four anode outputs in the X coordinate, PX1, PX2, PX3 and PX4, and four anode outputs in the Y coordinate, PY1, PY2, PY3 and PY4. Other embodiments can be provided for PS-PMTs with different numbers of anode outputs. Separate resistor chains with uniform resistors, R, are provided to connect the X coordinate and the Y coordinate anode outputs. The ends of each X and Y resistor chain are connected to uniform output signal amplifiers, A. The X coordinate provides two output signals, XA and XB. The Y coordinate also provides two output signals, YA and YB. Jumpers, P1, P2, P3, P4, P5A, P5B, P5C and P5D, are provided around each amplifier which allow the user to selectively bypass any amplifier. In FIG. 1, the jumpers are configured for the base to be used alone; without connection to any other bases. Jumpers P5A–D may have non-zero Ohm resistors.

Figure 2:
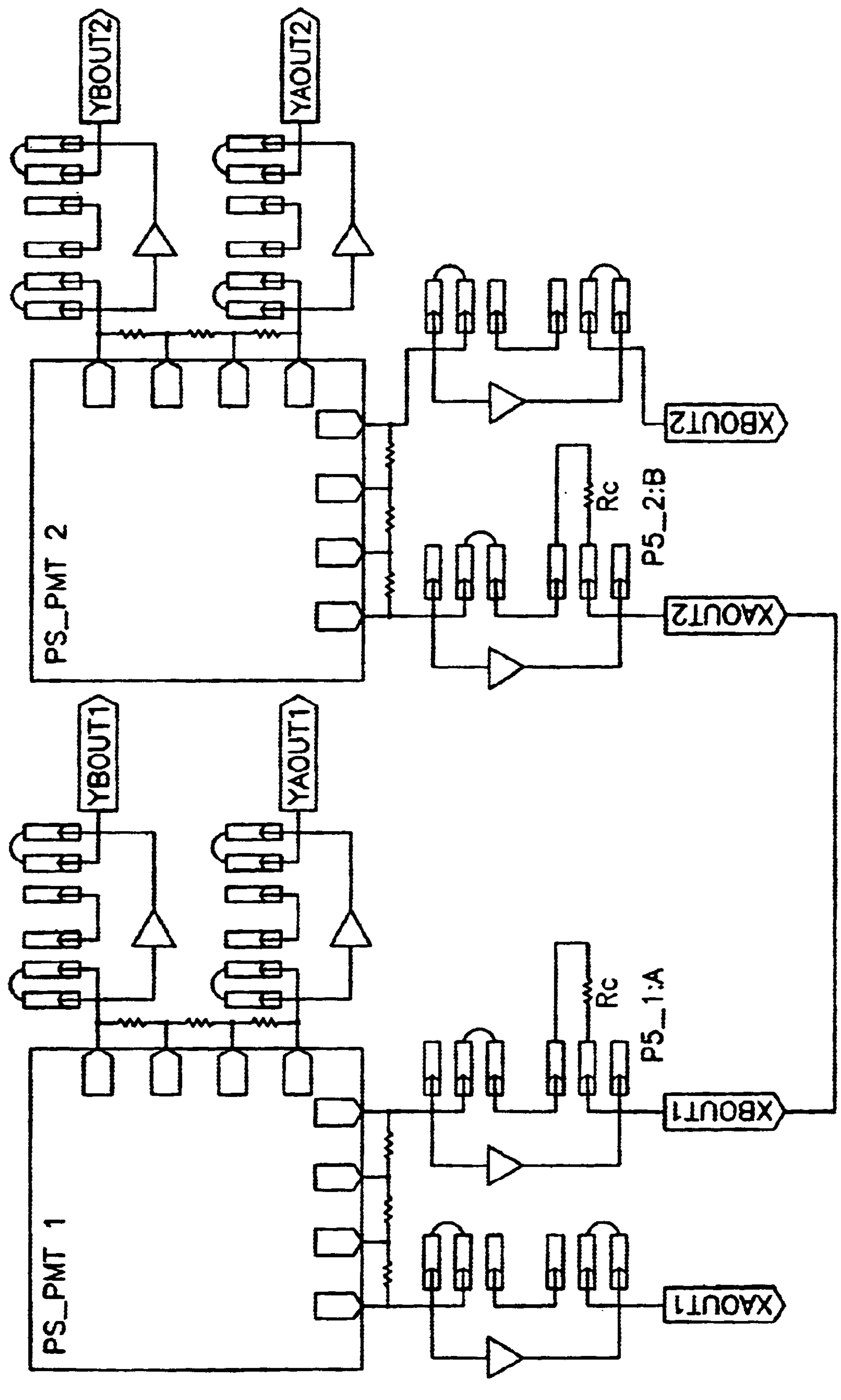
FIG. 2 shows two of the present configurable PS-PMT bases interconnected in order to double the imaging area.

FIG. 2 shows the connection of two of the present bases, which allows a user to double the observable imaging area. The base on the left of FIG. 2 receives eight anode signals from PS-PMT 1 and the base on the right receives eight anode signals from PS-PMT 2. In total the two bases receive and pass on for further processing sixteen anode signals, eight X coordinate and eight Y coordinate anode signals. The two bases are interconnected along their X coordinates via their respective internal jumpers, P1_1, P5_1:A, and P2_2, P5_2:B. This interconnection allows all eight X coordinate anode signals, from both PS-PMT 1 and PS-PMT 2, to be received via only one resister chain, thereby keeping the number of required output amplifiers at two. The jumpers include variable resistors, Rc, which are set to provide the required amount of resistance between the anode signals from the two different modular bases so that accurate image processing can be still be obtained from the resulting X coordinate output signals. Alternatively, external resistors can be used to connect resistor chains of separate bases. The two X coordinate output signals, XA1 and XB2, are read from the two exterior, or outside, amplifiers located at the two ends of the X coordinate resistor chain. The four Y coordinate outputs signals, YA1, YB1, YA2 and YB2, can be used individually or combined by means of signal splitter/combiners, with the proper impedance, to further reduce the number of output channels.

The two bases shown in FIG. 2 have a combined total of eight output amplifiers. If the two bases were used individually and not interconnected using the present method, all eight amplifiers would be required to produce an associated image. Using the same two bases connected in the manner shown in FIG. 2 allows the same area to be imaged with only six amplifiers; a savings of 25%. As will be seen in the discussion of FIG. 3, this savings in required hardware is increased when a larger number of modular bases are used.

Figure 3:
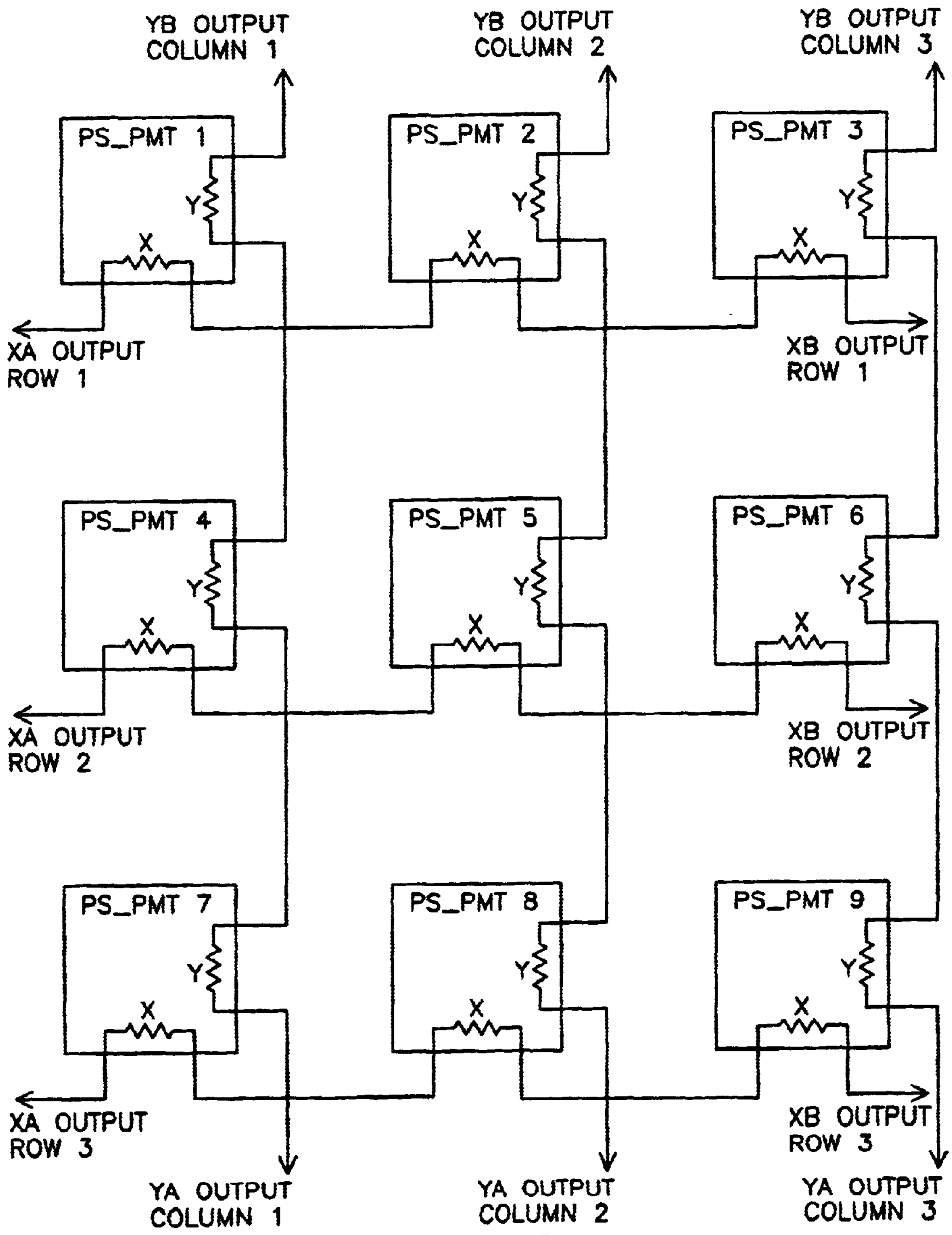
FIG. 3 illustrates a 3×3 matrix of the present configurable PS-PMT bases, which significantly increases the imaging area.

FIG. 3 illustrates the connections of nine of the present modular bases in a 3×3 matrix of PS-PMT's. The matrix, or array, of FIG. 3 has three X coordinate rows and three Y coordinate columns. The top row, row 1, has all of the X coordinate anodes of the three PS-PMT's, 1–3, in the row connected via one resistor chain. The resistor chain has two output channels, XA OUTPUT ROW 1 and XB OUTPUT ROW 1. The middle row, row 2, also has all of the X coordinate anodes of the three PS-PMT's, 4–6, in the row connected via one resistor chain. The resistor chain for the middle X coordinate row has output channels, XA OUTPUT ROW 2 and XB OUTPUT ROW 2. Likewise, the bottom row, row 3, has all X coordinate anodes connected via one resistor chain with output channels, XA OUTPUT ROW 3 and XB OUTPUT ROW 3. The PS-PMT bases are also interconnected along their Y coordinates to produce three Y coordinate columns, columns 1–3. The resistor chain for the left most column, column 1, connects all of the Y coordinate anode signals from the three PS-PMT's in the column and produces output signals YA OUTPUT COLUMN 1 and YB OUTPUT COLUMN 1. The resistor chain for the middle column, column 2, combines all of the anode signals from the middle column of PS-PMT's and produces output signals YA OUTPUT COLUMN 2 and YB OUTPUT COLUMN 2. Finally, the resistor chain for the right most column, column 3, combines all of the anode signals from that column of PS-PMT's and produces output signals YA OUTPUT COLUMN 3 and YB OUTPUT COLUMN 3.

This method of connecting modular PS-PMT bases provides a user with flexibility in the design of the array. Thus the array of PS-PMT's can be tailored to the imaging area requirements in regards to both the size and shape of the array. The present method also maintains the number of output channels that must be processed at two per coordinate (row or column), no matter how many PS-PMT's are used in the row or column. It should-be noted that any one of the nine bases in FIG. 3 could be removed from the 3×3 matrix and used by itself with only one PS-PMT. It should also be understood that an unlimited number of other modular bases could be added to any of the X rows to increase the imaging area without increasing the number of X output channels to be processed. Likewise, an unlimited number of extra bases could be added to any of the Y columns to increase the observable imaging area without increasing the number of Y output channels to be processed. If the nine bases of FIG. 3 were not interconnected as shown and instead used as individual PS-PMT bases, thirty-six output channels from the thirty-six amplifiers (4 from each of the 9 bases) would have to be received and processed in order to produce an image. Using the present bases and interconnection method reduces the number of output channels (amplifiers) that must be processed to produce the same image area down from thirty-six to twelve; a savings of 66.6%.

Figure 4:
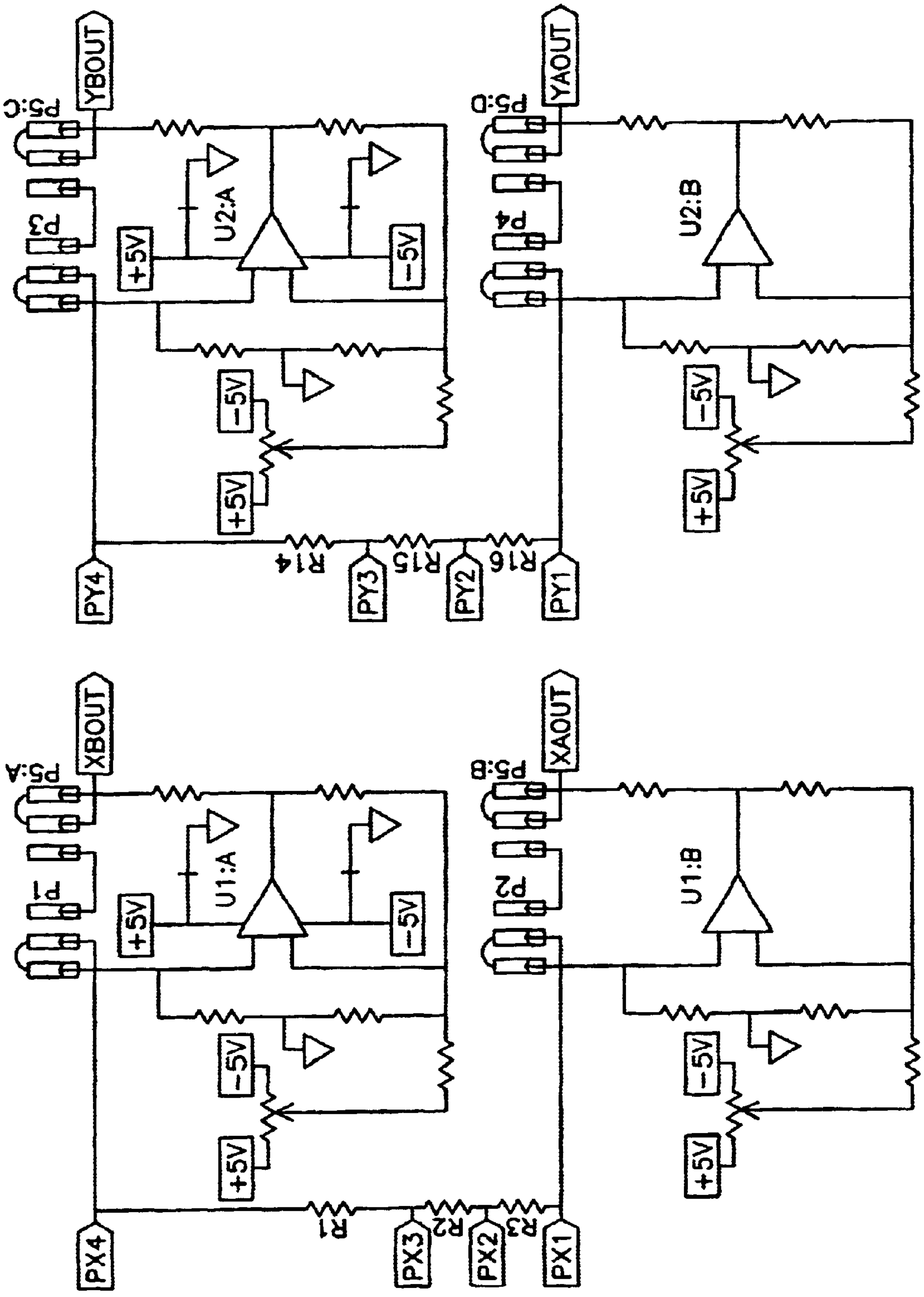
FIG. 4 is a schematic showing the electronics for the X and Y anode resistor chains and amplifiers.

FIG. 4 is a schematic showing the electronics of the resistor chains and amplifiers of an exemplary modular and configurable base. On the left hand side of FIG. 4, PX1, PX2, PX3 and PX4 represent the four X anodes of the PS-PMT. The X resistor chain comprising R1, R2 and R3, is used to receive each of the X anode signals. At the top end of the X resistor chain are Amplifier U1:A and an associated set of jumpers P1 and P5:A. At the bottom end of the X resistor chain are amplifier U1:8 and another set of associated jumpers, P2 and P5:B. The right hand side of the FIG. 4 shows the corresponding electronics for the Y anodes, PY1, PY2, PY3 and PY4, of the same PS-PMT. The Y resistor chain comprising R14, R15 and R16, is used to receive each of the Y anode signals. Amplifiers, U2:A and U2:B, and jumper sets, P3, P5:C and P4, P5:D are also shown at respective ends of the Y resistor chain. As discussed above, when the base is used as a stand-alone base, the jumpers provide an electrical connection to their associated output amplifiers, and each of the four amplifiers will be used to produce four output signals. When the base is connected to another modular base to increase the imaging area, the appropriate set of jumpers will be set to bypass one of the amplifiers and provide a resistive connection to a corresponding resistor chain of the other base. The amplifier on the other base that is between the two resistor chains being connected is also bypassed with the use of its associated set of jumpers. The electronics shown in FIGS. 4–6 are designed for the R5800-00-C8 PS-PMT from Hamamatsu Photonics Co., Ltd, and have been optimized for bandwidth, noise, gain, and reliability.

Figure 5:
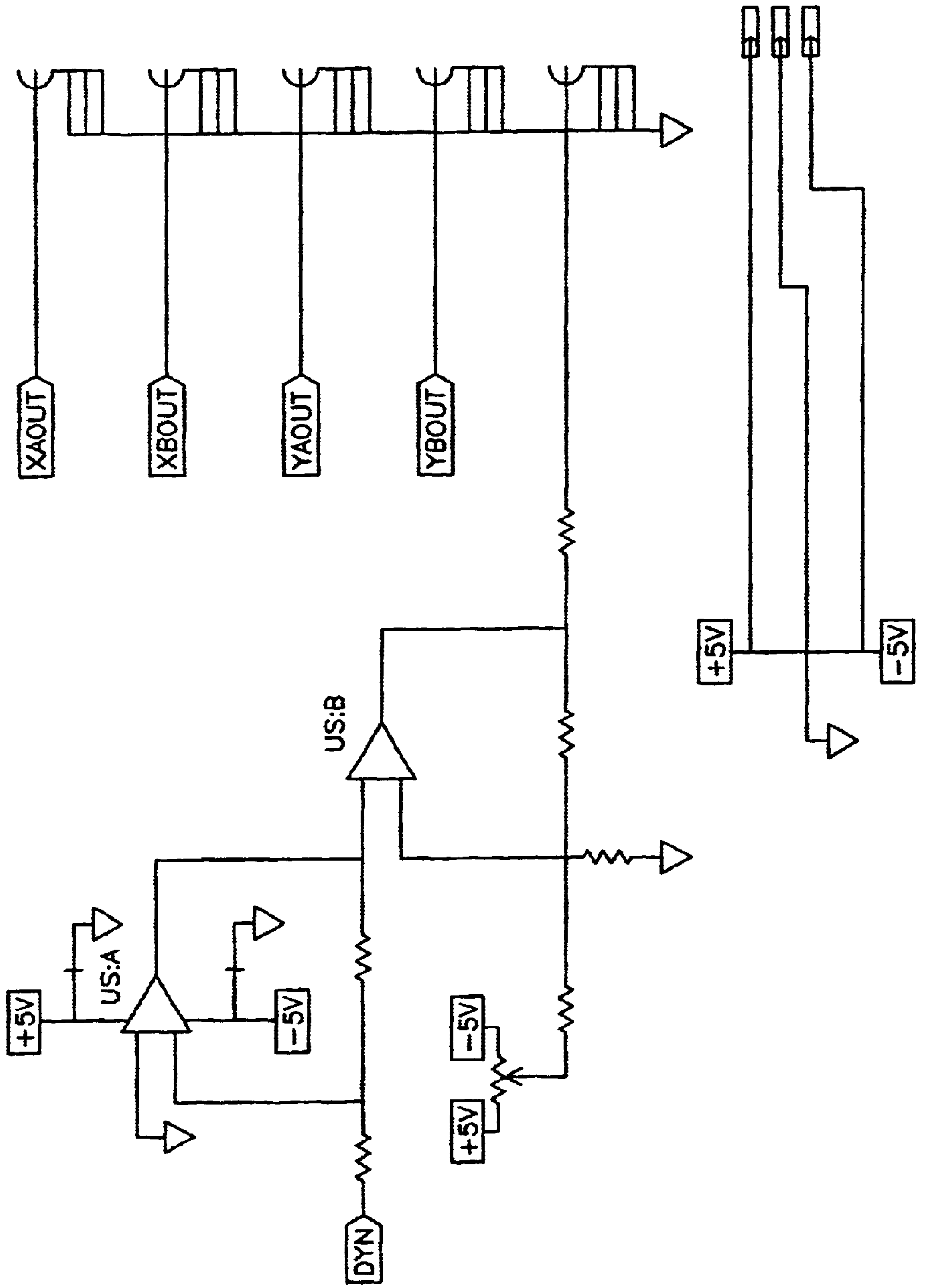
FIG. 5 is a schematic showing the electronics associated with the dynode signal amplification; and, FIG. 6 is a schematic showing the high voltage bias distribution with dynode signal pick-off.

FIG. 5 shows the electronics for dynode signal amplification. The dynode signal, DYN, is received from the dynode stages and amplified by amplifiers US:A and US:B.

Figure 6:
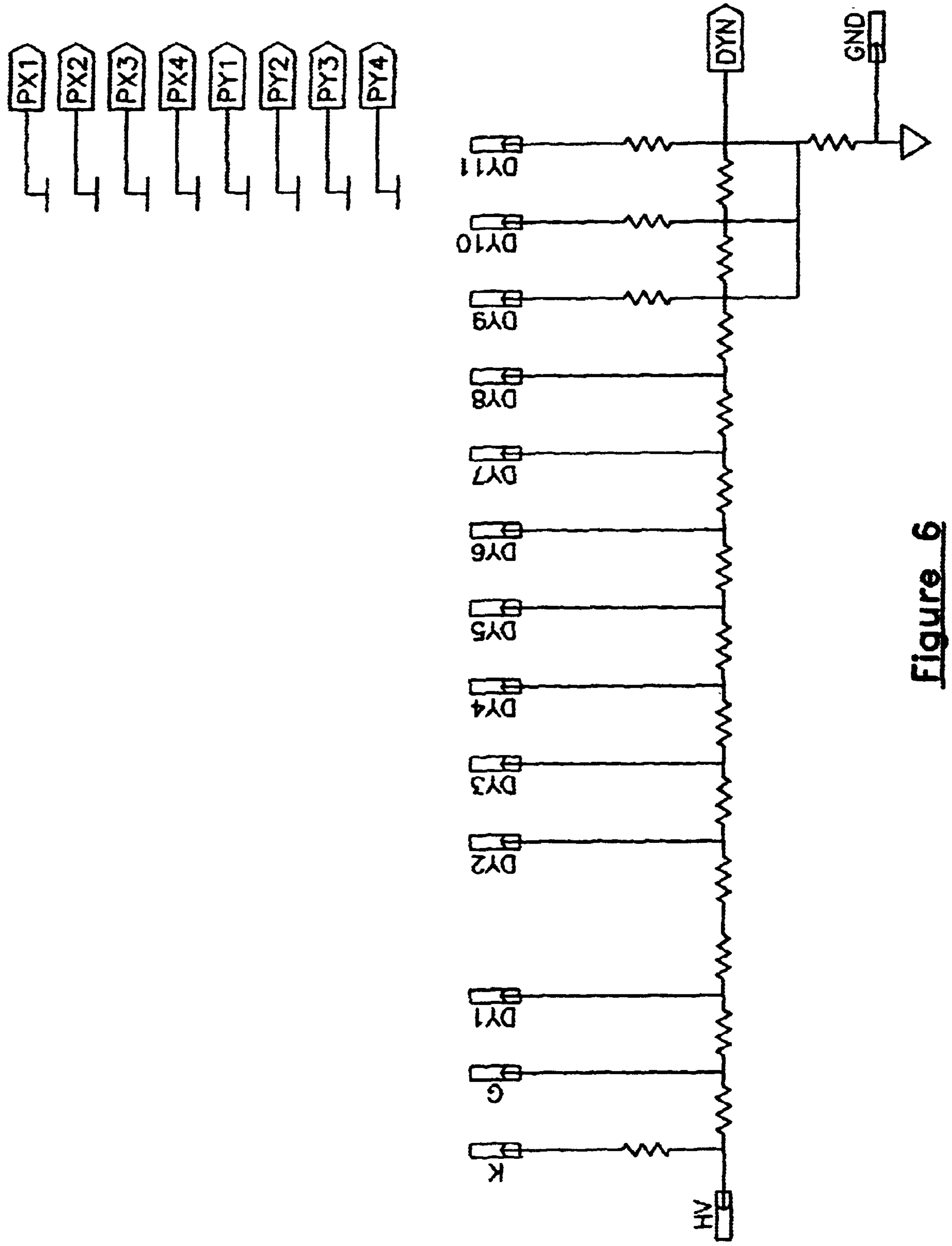

FIG. 6 shows the electronics for the high voltage bias distribution with dynode signal pick-off. The dynode stages, DY1-11, of the PS-PMT are provided with power via the high voltage power source, HV. The dynode stages, DY1-11, also produce the dynode signal, DYN, which is amplified (see FIG. 5) and made available for further processing.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A modular base for a position sensitive photo-multiplier tube (PS-PMT) that can be used by itself and can be coupled to one or more like modular bases to create a matrix of bases thereby providing a user with multiple options in regards to a number of bases to be used in X and Y coordinates within the matrix of bases, each modular base comprising:

an X coordinate resistor chain that connects all X coordinate anodes of the PS-PMT;

a Y coordinate resistor chain that connects all Y coordinate anodes of the PS-PMT;

two X output signal amplifiers for the X coordinate resistor chain, wherein one amplifier is provided at each end of the X coordinate resistor chain;

two Y output signal amplifiers for the Y coordinate resistor chain, wherein one amplifier is provided at each end of the Y coordinate resistor chain;

four sets of configuration jumpers, wherein one of the four sets of jumpers is associated with each of the output signal amplifiers and the jumpers can be individually configured to either bypass or include the amplifier in an output signal path of a respective resistor chain;

circuitry for high voltage biasing that provides power to all dynode stages of the PS-PMT; and, circuitry for dynode signal extraction and amplification that provides fast trigger qualification of signals from the dynode stages of the PS-PMT;

wherein, all four output signal amplifiers are used when the base is not attached to another modular base, less than four of the output signal amplifiers are used when the base is connected to one or more other modular bases, and the jumpers are used to electrically connect the X and/or Y resistor chain(s) to X and/or Y resistor chains of the other modular bases.

2. The modular base of claim 1, wherein variable resistors are provided with each set of jumpers.

3. The modular base of claim 1, wherein the PS-PMT includes one or more X coordinate anode outputs and one or more Y coordinate anode outputs.

4. The modular base of claim 1, wherein the X coordinate resistor chain is electrically connected to an X coordinate resistor chain of a second modular base and a resulting resistor chain uses only two amplifiers to amplify its output signals, one amplifier being on the base and a second amplifier being on the second modular base.

5. The modular base of claim 4, wherein the set of jumpers associated with the amplifier at the end of the X resistor chain that is connected to the resistor chain of the second base is bypassed by the associated set of jumpers, and this associated set of jumpers is also used to facilitate the electrical connection with the second base.

6. The modular base of claim 1, wherein the Y coordinate resistor chain is electrically connected to a Y coordinate resistor chain of a second modular base and a resulting resistor chain uses only two amplifiers to amplify its output signals, one amplifier being on the base and a second amplifier being on the second base.

7. The modular base of claim 6, wherein the set of jumpers associated with the amplifier at the end of the Y resistor chain that is connected to the resistor chain of the second base is bypassed by the jumpers, and this set of jumpers is also used to facilitate the electrical connection with the second base.

8. The modular base of claim 1, wherein the X coordinate resistor chain is electrically connected to an X coordinate resistor chain of a second modular base and a resulting X resistor chain uses only two amplifiers to amplify its output signals, one amplifier being on the base and a second amplifier being on the second base, and,the Y coordinate resistor chain is electrically connected to a Y coordinate resistor chain of a third modular base and a resulting Y resistor chain uses only two amplifiers to amplify its output signals, one amplifier being on the base and a second amplifier being on the third base.

9. The modular base of claim 1, wherein the dimensions of the base are approximately one inch by one inch by one inch.

10. A method for providing a modular base for Position Sensitive Photo-Multiplier Tube (PS-PMT) wherein, the modular base can be coupled to one or more like modular bases thereby providing a user with flexibility while designing an array of PS-PMT's, the method comprising the steps of:

providing an X resistor chain for all X coordinate anode outputs of the PS-PMT;

providing a Y resistor chain for all Y coordinate anode outputs of the PS-PMT;

connecting a signal amplifier to each end of the X resistor chain;

connecting a signal amplifier to each end of the Y resistor chain;

providing a set of configuration jumpers for each signal amplifier, wherein each set of jumpers can be set to either connect its associated amplifier to a resistor chain or bypass their associated amplifier and provide a resistive connection to another modular base;

including circuitry in the base for high voltage biasing; and, providing circuitry for dynode signal extraction and amplification that provides fast trigger qualification of dynode stages of the PS-PMT.

11. The method of claim 10, wherein the PS-PMT includes one or more X coordinate anode outputs, and one or more Y coordinate anode outputs.

12. The method of claim 10, wherein the step of providing a set of configuration jumpers for each signal amplifier, further comprises the step of:

providing variable resistors within each set of jumpers.

13. The method of claim 10, wherein the dimensions of the base are approximately one inch by one inch by one inch.

14. A method for interconnecting compact modular PS-PMT bases, wherein each base comprises an X coordinate resistor chain with a left amplifier at a left end of the resistor chain and a right amplifier at a right end of the resistor chain, a Y coordinate resistor chain with a top amplifiers at a top end of the Y resistor chain and a bottom amplifier at a bottom end of the Y resistor chain, a set of configuration jumpers associated with each amplifier wherein each jumper is initially set to include the associated amplifier in an anode output signal path and the jumpers can also be set to bypass its associated amplifier, circuitry for high voltage biasing, and circuitry for dynode signal extraction and amplification, the method comprising the steps of:

setting the set of jumpers associated with the right amplifier of a first modular base to bypass the right amplifier;

setting the set of jumpers associated with the left amplifier on a second modular base to bypass the left amplifier; and, electrically connecting the jumpers associated with the right amplifier of the first modular base to the jumpers associated with the left amplifier on the second modular base so that the X resistor chains of the first and second bases are electrically connected.

15. The method of claim 14, further comprising the steps of:

setting the set of jumpers associated with the left amplifier of the first modular base to bypass the left amplifier;

setting the set of jumpers associated with the right amplifier on a third modular base to bypass the right amplifier; and, electrically connecting the jumpers associated with the left amplifier of the first modular base to the jumpers associated with the right amplifier on the third modular base so that the X resistor chains of the first, second and third bases are electrically connected and output signals from the connected X resistor chains are amplified by the left amplifier of the third base and the right amplifier of the second base.

16. The method of claim 15, further comprising the steps of:

setting the set of jumpers associated with the top amplifier of the first modular base to bypass the top amplifier;

setting the set of jumpers associated with the bottom amplifier on a fourth modular base to bypass the bottom amplifier;

electrically connecting the jumpers associated with the top amplifier of the first modular base to the jumpers associated with the bottom amplifier on the fourth modular base so that the Y resistor chains of the first and fourth bases are electrically connected and output signals from the connected Y resistor chains are amplified by the two amplifiers.

17. The method of claim 16, further comprising the steps of:

setting the set of jumpers associated with the bottom amplifier of the first modular base to bypass the bottom amplifier;

setting the set of jumpers associated with the top amplifier on a fifth modular base to bypass the top amplifier;

electrically connecting the jumpers associated with the bottom amplifier of the first modular base to the jumpers associated with the top amplifier on the fifth modular base so that the Y resistor chains of the first, fourth and fifth bases are electrically connected and output signals from the connected Y resistor chains are amplified by the top amplifier of the fourth base and the bottom amplifier of the fifth base.

18. The method of claim 14, wherein only two amplifiers are used to amplify signals from the X resistor chain no matter how many bases are connected to the X resistor chain.

19. The method of claim 16, wherein only two amplifiers are used to amplify signals from the Y resistor chain no matter how many bases are connected to the Y resistor chain.

20. The method of claim 16, wherein internal variable resistors or external resistors are used to provide the electrical connections between jumpers.

* * * * *